(12) United States Patent
Haupt et al.

(10) Patent No.: US 8,130,285 B2
(45) Date of Patent: Mar. 6, 2012

(54) AUTOMATED SEARCHING FOR PROBABLE MATCHES IN A VIDEO SURVEILLANCE SYSTEM

(75) Inventors: Gordon T. Haupt, San Francisco, CA (US); Stephen D. Fleischer, San Francisco, CA (US); Robert P. Vallone, Palo Alto, CA (US); Stephen G. Russell, San Francisco, CA (US); Timothy B. Frederick, San Francisco, CA (US)

(73) Assignee: 3VR Security, Inc., San Francisco, CA (US)

( * ) Notice: Subject to any disclaimer, the term of this patent is extended or adjusted under 35 U.S.C. 154(b) by 1370 days.

(21) Appl. No.: 11/398,159

(22) Filed: Apr. 4, 2006

(65) Prior Publication Data

US 2007/0025593 A1 Feb. 1, 2007

Related U.S. Application Data

(60) Provisional application No. 60/668,643, filed on Apr. 5, 2005.

(51) Int. Cl.
*H04N 5/76* (2006.01)
*G06K 9/00* (2006.01)

(52) U.S. Cl. .................. 348/231.2; 382/118

(58) Field of Classification Search ............... 348/159, 348/149, 148, 161, 208.14, 143, 142, 153, 348/231.2, 211.11, 211.12, 207.99, 157, 348/158, 169; 382/115, 118
See application file for complete search history.

(56) References Cited

U.S. PATENT DOCUMENTS

| 5,073,950 | A | 12/1991 | Colbert et al. |
| 5,077,805 | A | 12/1991 | Tan |
| 5,715,325 | A | 2/1998 | Bang et al. |

(Continued)

FOREIGN PATENT DOCUMENTS

WO    WO 03/047258 A1    6/2003

OTHER PUBLICATIONS

"Notification of Transmittal of the International Preliminary Report on Patentability" received in International application No. PCT/US2005/008655.

(Continued)

*Primary Examiner* — David Ometz
*Assistant Examiner* — Ahmed A Berhan
(74) *Attorney, Agent, or Firm* — Hickman Palermo Truong & Becker LLP; Daniel D. Ledesma

(57) ABSTRACT

A technique for searching for probable matches in a video surveillance system is disclosed. A new event, such as a face captured in an image set, is matched against other events in a database of events. A similarity score is generated based on the difference between the new event and other events in the database. The similarity score may be weighted by information external to the image sets. Because of limited system resources, an association between a new event and every other event in the system may not be kept. Thus, when searching for probable matches of a particular event, some events that are related to the particular event may not be initially selected. Such events may be associated with an event in a first set of events that are associated with the particular event. Therefore, a second set of events is selected that are associated with the first set of events.

24 Claims, 4 Drawing Sheets

U.S. PATENT DOCUMENTS

| | | | |
|---|---|---|---|
| 5,844,991 | A | 12/1998 | Hochberg et al. |
| 5,850,470 | A | 12/1998 | Kung et al. |
| 6,038,333 | A | 3/2000 | Wang |
| 6,181,806 | B1 * | 1/2001 | Kado et al. ............ 382/118 |
| 6,188,381 | B1 | 2/2001 | van der Wal et al. |
| 6,285,995 | B1 * | 9/2001 | Abdel-Mottaleb et al. ... 707/737 |
| 6,549,913 | B1 | 4/2003 | Murakawa |
| 6,754,389 | B1 | 6/2004 | Dimitrova et al. |
| 6,999,613 | B2 | 2/2006 | Colmenarez et al. |
| 7,016,532 | B2 | 3/2006 | Boncyk et al. |
| 7,068,723 | B2 | 6/2006 | Foote et al. |
| 7,298,895 | B2 | 11/2007 | Loui et al. |
| 7,310,442 | B2 | 12/2007 | Monachino et al. |
| 7,337,127 | B1 | 2/2008 | Smith et al. |
| 7,421,097 | B2 | 9/2008 | Hamza et al. |
| 7,450,735 | B1 | 11/2008 | Shah et al. |
| 7,558,408 | B1 | 7/2009 | Steinberg et al. |
| 2002/0136434 | A1 | 9/2002 | Kuroda et al. |
| 2002/0176610 | A1 | 11/2002 | Okazaki et al. |
| 2002/0196327 | A1 | 12/2002 | Rui et al. |
| 2003/0086496 | A1 | 5/2003 | Zhang et al. |
| 2003/0210808 | A1 | 11/2003 | Chen et al. |
| 2003/0217294 | A1 | 11/2003 | Kyle |
| 2004/0008873 | A1 * | 1/2004 | Sogo et al. ............ 382/118 |
| 2004/0073543 | A1 | 4/2004 | Kim et al. |
| 2004/0264780 | A1 | 12/2004 | Zhang et al. |
| 2006/0066722 | A1 | 3/2006 | Yin et al. |

OTHER PUBLICATIONS

Current claims of PCT/US2005/008655.

"Notification of Transmittal of the International Preliminary Report on Patentability" received in International application No. PCT/US2005/008735.

Current claims of PCT/US2005/008735.

Javed, O. et al., "Tracking Across Multiple Cameras with Disjoint Views" Proceedings of the Ninth IEEE International Conference on Computer Vision, 2003 IEEE (6 pages).

"Written Opinion of the International Preliminary Examining Authority" received in related International application No. PCT/US2005/008655.

Pending claims of related International application No. PCT/US2005/008655.

* cited by examiner

AUTOMATED SEARCHING FOR PROBABLE MATCHES IN A VIDEO SURVEILLANCE SYSTEM

CLAIM OF PRIORITY

This application claims domestic priority under 35 U.S.C. 119(e) to U.S. Provisional Patent Application No. 60/668,643, filed Apr. 5, 2005, entitled AUTOMATED SEARCHING FOR PROBABLE MATCHES IN A VIDEO SURVEILLANCE SYSTEM, the contents of which are hereby incorporated by reference in their entirety for all purposes.

RELATED APPLICATIONS

This application is related to U.S. Provisional Patent Application No. 60/554,050, filed on Mar. 16, 2004, entitled VIDEO INTELLIGENCE PLATFORM; U.S. patent application Ser. No. 10/965,687, filed on Oct. 13, 2004, entitled PIPELINE ARCHITECTURE FOR ANALYZING MULTIPLE VIDEO STREAMS; U.S. patent application Ser. No. 11/081,753, filed Mar. 15, 2005, entitled INTERACTIVE SYSTEM FOR RECOGNITION ANALYSIS OF MULTIPLE STREAMS OF VIDEO; and U.S. Provisional Patent Application 60/668,645, filed on Apr. 5, 2005, entitled METHOD AND APPARATUS FOR MONITORING AND PRESENTING DATA IN A VIDEO SURVEILLANCE SYSTEM. The contents of each related application are herein incorporated by reference in their entirety for all purposes.

FIELD OF THE INVENTION

The present invention relates to video surveillance systems, and more specifically, to an automated technique for searching for probable matches in a video surveillance system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

"Biometrics" refers to unique physiological and/or behavioral characteristics of a person that can be measured or identified. Example characteristics include height, weight, shape, fingerprints, retina patterns, skin and hair color, and voice patterns. Identification systems that use biometrics are becoming increasingly important security tools. Identification systems that recognize irises, voices or fingerprints have been developed and are in use. These systems provide highly reliable identification, but require special equipment to read the intended biometric (e.g., fingerprint pad, eye scanner, etc.) Because of the expense of providing special equipment for gathering these types of biometric data, facial recognition systems requiring only a simple video camera for capturing an image of a face have also been developed.

In terms of equipment costs and user-friendliness, facial recognition systems provide many advantages that other biometric identification systems cannot. For example, face recognition does not require direct contact with a user and is achievable from relatively far distances, unlike most other types of biometric techniques, e.g., fingerprint and retina pattern. In addition, face recognition may be combined with other image identification methods that use the same input images. For example, height and weight estimation based on comparison to known reference objects within the visual field may use the same image as face recognition, thereby providing more identification data without any extra equipment.

However, facial recognition systems can have large error rates. In order to provide the most reliable and accurate results, current facial recognition systems typically require a person who is to be identified to stand in a certain position with a consistent facial expression, facing a particular direction, in front of a known background and under optimal lighting conditions. Only by eliminating variations in the environment is it possible for facial recognition systems to reliably identify a person. Without these types of constraints in place, the accuracy rate of a facial recognition system is poor, and therefore facial recognition systems in use today are dedicated systems that are only used for recognition purposes under strictly controlled conditions.

Video surveillance is a common security technology that has been used for many years. The equipment (i.e., video camera) used to set up a video surveillance system is inexpensive and widely available. A video surveillance system operates in a naturalistic environment, however, where conditions are always changing and variable. A surveillance system may use multiple cameras in a variety of locations, each camera fixed at a different angle, focusing on variable backgrounds and operating under different lighting conditions. Therefore, images from surveillance systems may have various side-view and/or top-view angles taken in many widely varying lighting conditions. Additionally, the expression of the human face varies constantly. Comparing facial images captured at an off-angle and in poor lighting with facial images taken at a direct angle in well lit conditions (i.e., typical images in a reference database) results in a high recognition error rate.

In a controlled environment, such as an entry vestibule with a dedicated facial recognition security camera, the comparison of a target face to a library of authorized faces is a relatively straightforward process. An image of each of the authorized individuals will have been collected using an appropriate pose in a well lighted area. The person requesting entry to the secured facility will be instructed to stand at a certain point relative to the camera, to most closely match the environment in which the images of the authorized people were collected.

For video surveillance systems, however, requiring the target individual to pose is an unrealistic restriction. Most security systems are designed to be unobtrusive, so as not to impede the normal course of business or travel, and would quickly become unusable if each person traveling through an area were required to stop and pose. Furthermore, video surveillance systems frequently use multiple cameras to cover multiple areas and especially multiple entry points to a secure area. Thus, the target image may be obtained under various conditions, and will generally not correspond directly to the pose and orientation of the images in a library of images.

A set of identifying information extracted from one or more images is called a "feature set." A feature set of a target image allows the target image to be compared with some or all images stored in the surveillance system. The resulting comparison between two images is called a "similarity score." However, storing features sets and similarity scores for every image in the surveillance system requires a significant amount of resources, such as memory and CPU cycles. Therefore, many systems 1) store only a subset of all possible feature sets and 2) identify only a subset of all the events that may match a target event. Such systems are referred to as "limited knowledge systems."

For example, a limited knowledge system may maintain a list of the top five probable matches of a target event. If a user desired to view the top ten probable matches to the target event, then the user would be unable to do so.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
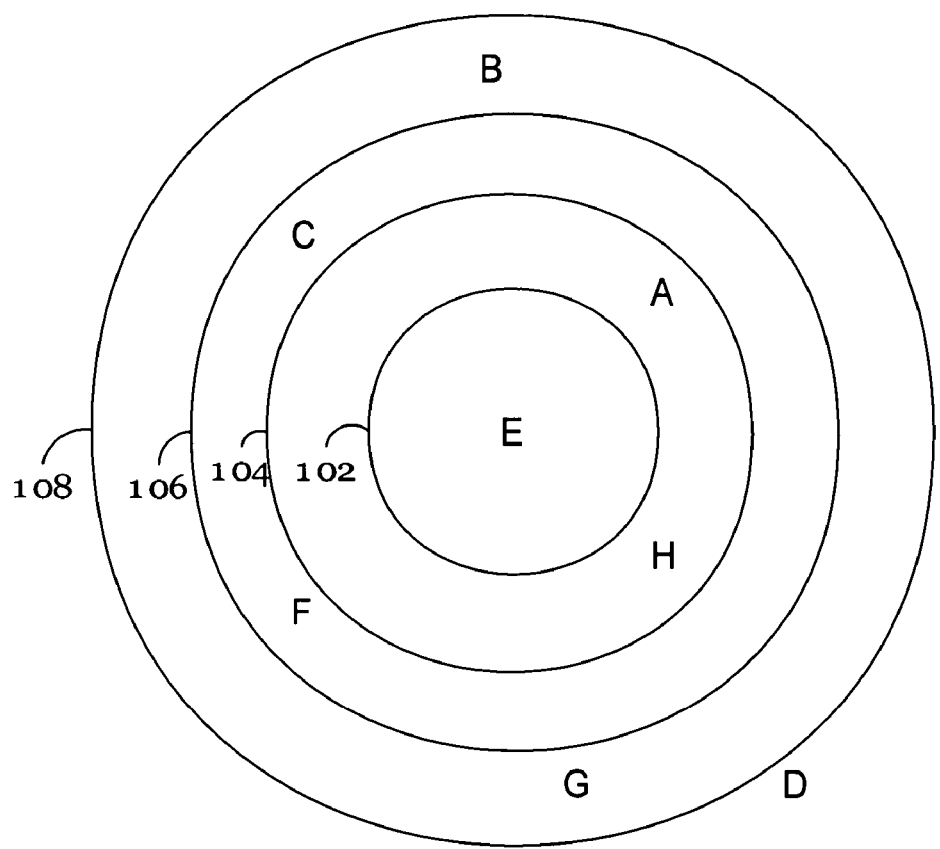
FIG. 1 is a diagram that illustrates a similarity space of a target event, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A technique for searching for probable matches in a video surveillance system is disclosed. In one embodiment, a target event, such as a face depicted in a set of images, is matched against other events stored in a database of events. Embodiments of the invention are not limited to faces. A video surveillance system may track objects other than faces, including, but not limited to, license plates or guns.

Each event may be associated with a feature set, which is a set of identifying information of an object in the image set of an event. Using the feature sets of the target events and the other events in the database, multiple similarity scores between the target event and the other events are generated. To increase the likelihood of identifying relevant probable matches, the multiple similarity scores are weighted based on information external to the feature sets of the events. Based on the weighted similarity scores, associations are made between the target event and the other events.

Because of limited system resources, it may not be desirable to permanently store all of the information used to compare events to other events, or all information produced by comparing events to other events. For example, it may not be desirable to store a feature set for every event. As another example, it may not be desirable to store the similarity scores produced by every event-to-event comparison.

The failure to permanently store information used to compare events affects the ability to make future comparisons. For example, a similarity score may not be generated between a preceding event and a new event if the feature set of the preceding event was discarded before the new event was created. An existing event that is not directly compared to a new event is referred to herein as an "incomparable event".

Thus, when searching for probable matches of a target event based on similarity scores, some incomparable events that should match the target event may not be initially selected as matches (e.g. because their feature sets have previously been discarded). According to one embodiment, incomparable events may be matched to the target event based on the fact that the incomparable events are known to be similar to other events that are matched to the target event. Incomparable events that are matched to a target event in this manner are referred to herein as "indirectly matched" events.

DEFINITIONS

The following are definitions of terms that are used throughout the application:

An "image set" is a set of one or more images, each of which depict the same object.

An "event" includes one or more related image sets. An event optionally includes other information, such as the date and time the image set(s) were captured, the identity of the camera(s) that captured the image set(s), and the physical location(s) of the camera(s).

A "feature set" is a set of identifying information (such as height, color, shape, facial characteristics, etc.) extracted from one or more image sets of an event. As shall be described in greater detail hereafter, features sets may be used to compare events with other events.

A "non-feature set event" is an event that is not currently associated with a stored feature set.

An "incomparable event" is an event that is not directly compared to a target event.

A "directly matched event" is an event that is matched to a target event based on a comparison of the feature set of the event with the feature set of the target event.

An "indirectly matched event" is an event that is matched to a target event based on something other than a comparison of the feature set of the event with the feature set of the target event.

A "profile" is an event that is associated with a feature set.

In order for a non-feature set event to become a profile, the feature set is 1) generated from the image set associated with the non-feature set event, 2) stored in the surveillance system, and 3) associated with the corresponding event.

The result of the comparison between feature sets is called a "similarity score". Using similarity scores, a target object may be compared with one or more other objects (e.g. faces of known criminals or license plates of stolen cars) stored in a surveillance system to determine whether the target object matches the one or more other objects.

Event Information

According to one embodiment, the surveillance system stores information about each event identified by the surveillance system. The information stored in association with an event may include, for example: feature sets, similarity scores, temporal or spatial information, and scored-event lists. According to one embodiment, some events are only associated with a subset of this information. Techniques are described hereafter for finding matching events for a target event in a system that does not maintain all information for all events.

Similarity Scores

The feature sets of two events can be compared to each other to produce a similarity score that indicates the degree of similarity between the two events. Various techniques may be used to generate similarity scores based on feature sets. The techniques described herein are not limited to any particular scoring technique. Further, any type of point or relational scale may be used to illustrate the similarity between two feature sets. For example, a scale of zero to one may be used where a score of 1.0 might indicate a perfect match and a 0.0 may indicate that there is no relation between the feature sets. Or, a non-numerical scale of "highly likely," "likely," and "not likely" may be used.

Weighted Similarity Scores

The similarity score between the feature sets of two events may be weighted (before or after entries to events are stored in sets of stored events) based on external information, such as the order in which the events occurred or other external information, such as time proximity, spatial proximity, organizational info (e.g., department), etc. For example, the similarity scores may be weighted based, at least in part, on one or more of the following: 1) how long an event has been stored, 2) the date and time the event occurred, 3) the one or more cameras that captured the event, and 4) physical location of the one or more cameras that captured the event.

For example, if two events have a similarity score of 0.8, but the events occurred within a few minutes of each other in locations separated by hundreds of miles, then the similarity score may be weighted negatively, such as a resulting similarity score of 0.1 or 0.0. As another example, if two events have a similarity score of 0.7 and the events occurred within a few minutes of each other and were captured by the same camera or were captured by different cameras in the same office building, then the similarity score may be weighted positively, such as a resulting similarity score of 0.9.

Spatial and Temporal Information

Events may also be associated with temporal and spatial information. For example, an event may be associated with information that indicates the date and time the event occurred, the particular camera that captured the event, and where the event occurred. As an example, temporal and spatial information for event A may indicate that event A occurred at time 21:53:09 on Apr. 5, 2006 and was captured by camera 18 in a particular hotel lobby.

Scored-Event Lists

Events may also be associated with scored-event lists. According to one embodiment, each entry in the scored-event list of a particular event (1) identifies another event, and (2) indicates the similarity score between the particular event and the other event. In one embodiment, the scored-event list of each event includes an entry for each other event that has been identified by the system.

According to an alternative embodiment, the scored-event list of a particular event does not include an entry for every other event that has been identified by the system. Instead, the scored-event list includes entries for only those events that are most likely to match the particular event, based on the similarity scores. An example of a scored-event list for event A may be the following:

| Event | Similarity Score |
|-------|------------------|
| D | 0.85 |
| G | 0.81 |
| Y | 0.96 |
| QQ | 0.89 |

According to the above scored-event list, the events that match event A most closely (as far as the system "knows") are events D, G, Y, and QQ. Event Y has the highest similarity score (i.e. 0.96 on a scale from zero to one) with event A among events in the scored-event list.

According to one embodiment, the scored-event list for an event is generated at the time the event is created. Consequently, the scored-event list will only include entries for events that existed at the time the event was created. Events created after that event will not be included in the scored-event list, even though they may have similarity scores that would otherwise qualify them to be included in the scored-event list.

Partial Scored-Event Lists

Unfortunately, scored-event lists may consume system resources that are vital for other needs, such as storing additional events. Therefore, instead of maintaining references to every other event in the surveillance system, the number of references to events in the scored-event list may be restricted based on certain factors. A scored event-list whose entries have been restricted is referred to herein as a partial scored-event list. A system that supports partial scored-event lists is not a "complete knowledge" system, but rather a "limited knowledge" system.

One way to restrict the number of references may simply be to limit the number of entries to a certain number. For example, a partial scored-event list of a target event may be restricted to entries for only the events associated with the N highest similarity scores relative to the target event. Other factors for restricting the number of entries in a scored-event list include restricting the scored-event list to entries for events: 1) within a certain period of time, 2) at a particular physical location, 3) with a similarity score above a certain threshold, or 4) any combination of the above factors.

For example, if the scored-event list illustrated above is restricted to five entries (in which case there is room to include one more entry), then an entry to a subsequent event with a similarity score above zero may be added to the list. As another example, if the scored-event list is restricted to events with similarity scores of 0.8 and above, then an entry to a subsequent event with a similarity score above 0.8 may be added in the list. As another example, if the scored-event list is restricted to four events and each event must have a similarity score over 0.8, then, in order to be added to the list, a subsequent event must have a similarity score of 0.85 or higher, and the entry to event D would be deleted from the list.

Other factors may be taken into account in managing scored-event lists, such as how long an entry to an event has been stored in a scored-event list. Also, the restrictions on whether the entries of certain events are included in a scored-event list may vary among various events. In other words, the scored-event list associated with event A may be restricted to five entries, whereas the scored-event list associated with event B may be restricted to entries of events with similarity scores above 0.7.

As mentioned above, scored-event lists are typically "backward looking". That is, a scored-event list of a given event typically stores entries for events that preceded the given event. According to one embodiment, the scored-event list of a given event may also be updated to include events that are created after the given event. However, updating scored-event lists to reflect later-created events has the potential to create redundancy. For example, suppose event A preceded event B in time. Further suppose that the similarity score between event A and event B is 0.98, indicating that they are very likely to match each other. The scored-event list for event A would include an entry to event B and the scored-event list for event B would include an entry to event A. Nevertheless, determining probable matches of a target event may be faster when the scored-event list associated with the target event includes entries to events that both precede and follow the target event than when traversing the scored-event list of every subsequent event to the target event.

Instead of or in addition to maintaining separate scored-event lists for each event, the scored-event list information for all events may be stored in a single table. Further, while similarity scores may be used to determine which events are included in the scored-event list of a given event, the similarity scores themselves need not be included in the entries.

Complete Knowledge System

In one embodiment, a search database stores all events, the feature sets of all events, and the similarity scores between each event and every other event. A system in which all of this information is persistently stored is referred to herein as a complete-knowledge system. In a complete-knowledge system, searching for the events that match a target event is relatively straightforward. In one embodiment, the matching events for a target event would simply be the events, in the scored-event list of the target event, that have similarity scores above a specified threshold.

For example, see FIG. 1. Assume, as FIG. 1 illustrates, there are events A-H where event E is the target event. In this example, circles 102, 104, 106 and 108 represent similarity scores of 0.95, 0.85, 0.75, and 0.65 respectively. Therefore, any event "residing" within circles 102 and 104 has a similarity score of between 0.95 and 0.85 (e.g. events A and H) and any event outside circle 108 has a similarity score below 0.65 (e.g. event D). Again, any other similarity score scale may be used to indicate the difference between a target event and a non-target event.

Figure 2:
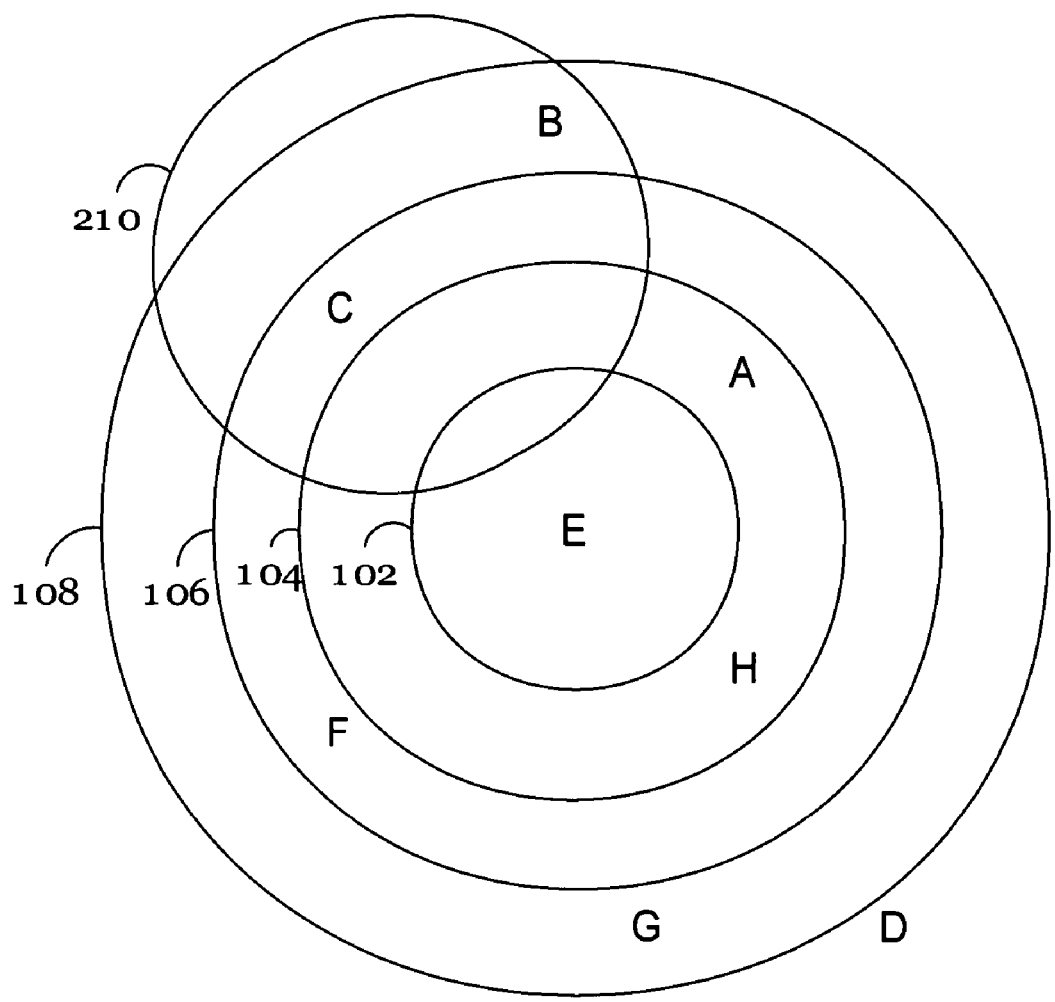
FIG. 2 is a diagram that illustrates a similarity space of a target event for a two degrees of separation search, according to an embodiment of the invention.
Figure 3:
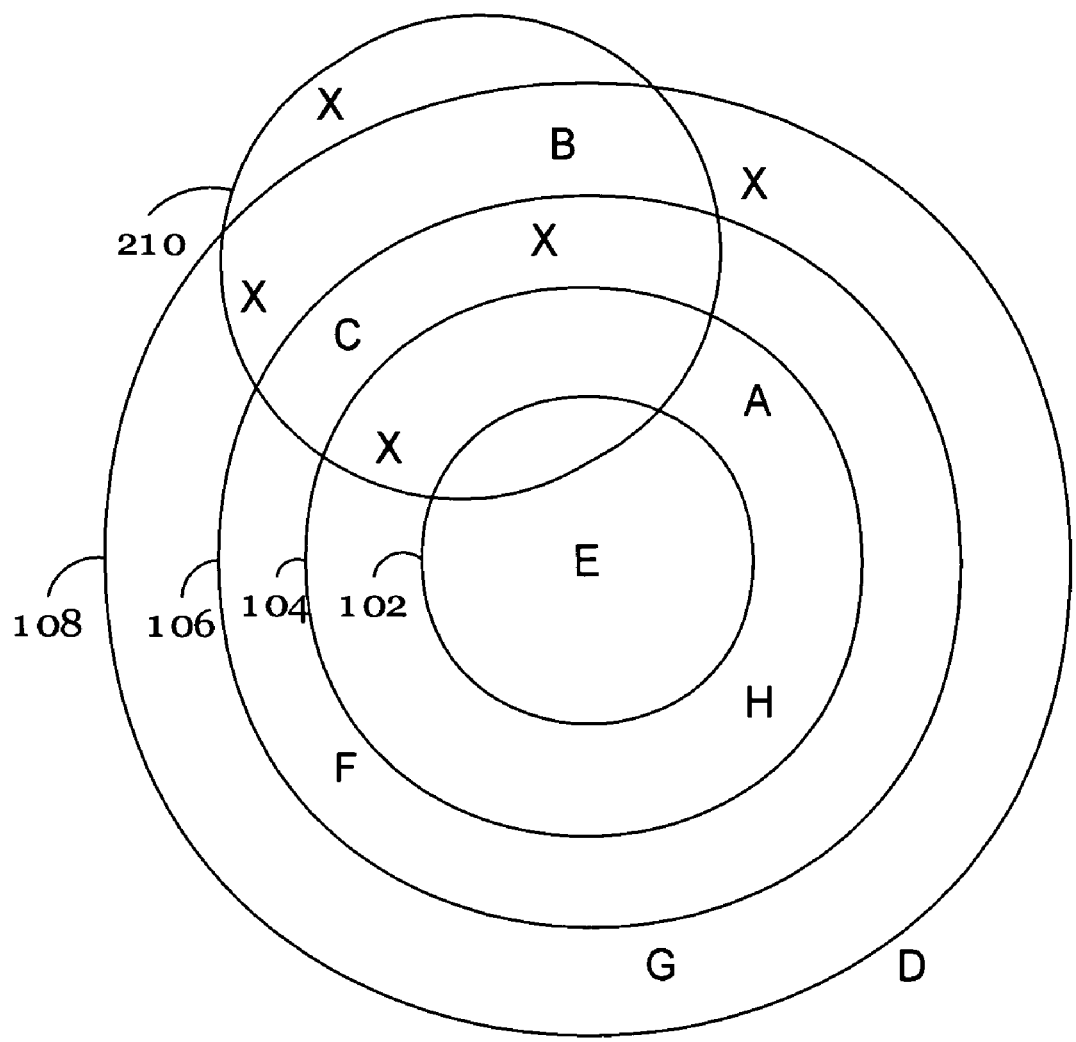
FIG. 3 is a diagram that illustrates a similarity space for a two degrees of separation search where a subset of the events in the similarity space do not include corresponding feature sets, according to an embodiment of the invention.

The circles are only for aiding in the understanding of how non-target events are different from a target event for difference reasons. A one-dimensional line may be used, instead of a target diagram as in FIGS. 1-3, to indicate the difference in similarity scores between other events in relation to a target event. However, a multi-dimensional diagram is used to account for the fact that, although the similarity scores between a target event and two non-target events may be the same, the two non-target events may be very different from each other. The two non-target events may be different from a target event for various reasons. For example, in the case of face objects, the target event may differ from one non-target event because of a difference in the distance from ear-to-ear. The target event may differ from another non-target event because of a difference in the width of the nose. However, the similarity scores of the non-target events in relation to the target event may be the same.

If N different measurements of a face are made and those measurements are used to calculate a similarity score, then an N-dimensional similarity space may be used to illustrate the differences between a target event and other events. However, it is difficult to illustrate anything more than two dimensions on paper. Therefore, despite the two-dimensional limitation, FIG. 1 attempts to illustrate that non-target events may be different from a target event for various reasons. For example, in FIG. 1, event A and event H may be associated with the same similarity score in relation to event E (e.g. 0.9). However, events A and H reside in different locations in two-dimensional space because they are different from event E for different reasons.

Returning to FIG. 1, at the time event E was created, suppose event E matched events A, B, C & D at scores 0.9, 0.7, 0.8 and 0.6 respectively. Events F, G and H were created after event E, and matched event E at scores 0.8, 0.7 and 0.9. If a specified threshold of a search for probable matches of event E were set to 0.75, then the search would return events A, C, F & H.

In an embodiment where the scored-event list of an event is limited to events that preceded the event, the system would identify matching events A and C by examining the scored-event list of event E. The system would identify the later-created matching events F and H by examining the scored-event list of the events created after event E.

Limited Knowledge System

Two factors may limit the knowledge of a system: 1) finite database size or computation power, which may be manifested in the limited number of event entries in a scored-event list, and 2) time directional information. Time directional information refers to the fact that similarity scores for a new event are only calculated against feature sets that are in the system at the time the new event is generated. If the feature set associated with an event is not stored in the system (e.g., due to a positive match or a need to limit the number of feature sets because of system resource constraints), then the system cannot calculate similarity scores between that event and future events.

The following is a description of a "degrees of separation" approach for searching for probable matches to a target event in a limited knowledge system.

Searching in Limited Knowledge Systems

Case 1

By limiting the number of entries in a scored-event list, it is possible that a search performed in a limited knowledge system will return fewer results than a complete knowledge system. For example, assume that an event is considered to "match" a target event if the similarity score between the event and the target event is above a certain threshold. Under these circumstances, a search performed in a limited knowledge system for events that match the target event may return only a subset of what would have been returned in a complete knowledge system.

For example, suppose (in FIG. 1) the limit on the number of entries in the scored-event list of event E is set to two, and a search is being made to find the entries that match event E. Assume further that the "match threshold" of the search is set to 0.65. Because scored-event lists are limited to two entries, entries to events B and D would no longer be listed in the scored-event list for event E (only entries to events A and C would be in the scored-event list of event E). Hence, a search for events that match event E would not select event B, even though event B would have been considered a match in a complete knowledge system. Similarly, events F, G, and H would not have entries to event E stored in their respective scored-event lists, if there were at least two other entries to events with similarity scores higher than event E in the respective scored-event lists.

Degree of Separation Search

According to one embodiment, techniques are provided for increasing the accuracy of search results in a limited knowledge system by supplementing a scored-events list search with a "two degree of separation" search. Specifically, during a first search phase, the system identifies all events that have similarity scores within a first threshold of the target event. Events selected during the first phase constitute directly-matched events. Then, during a second search phase, all events that have similarity scores within a second threshold of each of the directly-matched events are selected. Events selected during all phases after the first phase constitute indirectly-matched events.

Search process may proceed through any number of phases, where each phase searches for events that have similarity scores above a certain threshold relative to the events that were identified in the immediately-preceding phase. The similarity thresholds used during the various phases may all be the same, or may differ from phase-to-phase.

The two degree of separation search is used to help identify additional events in limited knowledge systems. If event A and event C are selected during the first phase based on a first threshold (e.g. 0.65), then the second phase will select event B (see FIG. 2) if an entry to event B is in the scored-event list for event C and the similarity score between events C and B meets or exceeds a second threshold (indicated by circle 210 in FIG. 2) (e.g. 0.75). Consequently, the events selected by the limited system would more closely resemble the events that would have been selected by a complete knowledge system (which would have selected event B as a probable match to event E based on solely the first threshold).

However, if event H is selected in the first phase based on the first threshold, a search near event H might cause event D to be selected during the second phase, even though event D would not have been selected by a complete knowledge system. Thus, a two degree of separation search does not guarantee the same (i.e. ideal) result set for every search, but rather attempts to approximate the ideal result set.

Matching Non-Feature Set Events

Case 2

As mentioned above, by not keeping all feature sets in the search database an asymmetry arises between backward and forward searches in time from a target event. Specifically, any non-feature set event that occurred before a target event was created will not have had similarity scores calculated against that non-feature set event (as that feature set was not in the event database at the time the target event was created). This is because when the non-feature set event occurred, it could only be compared against the feature sets existing at that time. Since the feature sets were dropped from the searchable database (presumably because a positive match occurred or because of limited system resources) before the target event occurred, a similarity score could not be calculated between the target event and those non-feature set events.

The N-degree of separation search technique described above may be used to find matching non-feature set events. Specifically, during the first phase, a forward time search and a backward time search may be performed to find all directly-matched events. In the present example, the backward time search against the first threshold only yields the events that (1) were in the system at the time the target event was created, and (2) had feature sets at the time the target event was created. Using the example in FIG. 3, assume event E has matched events A-D and F-H, as described above for FIG. 1. The backward time search may yield events A-D, but would miss any of the events labeled X (which are non-feature set events) if they occurred prior to event E, as the associated feature sets were not in the system at the time event E occurred.

One way to find some of these events is, during a second search phase, to search near event C with a second threshold, which may or may not be the same as the first threshold that allowed event C to be selected. In a forward search from event C, the scored-event list for one or more non-feature set events may indicate event C as a probable match. Again, the final result set at least approximates that which would have been found in the ideal case of a complete knowledge system.

Converting a Limited-Knowledge System to a Complete-Knowledge System

If, at any time, the limit on the number of event entries in a scored-event list can be removed (even temporarily), and enough information has been kept to recreate feature sets (e.g., from the raw images) for non-feature set events, then a limited knowledge system may be converted back to a complete knowledge system.

For example, if any two events do not have an associated similarity score, the two feature sets are used to generate a similarity score. If one or both events do not have feature sets associated with them, then a feature set for the non-feature set event is generated in order for a similarity score to be generated. The scored-event list for one (or both events) is updated to include an entry to the other event. The feature set of either event may be stored along with the event or deleted.

The conversion from a limited knowledge system to a complete knowledge system may, however, take substantial memory and CPU resources. If conversion is not possible or not desirable, then other approximate methods (as described above) may be used to create the best possible search result set.

Hardware Overview

Figure 4:
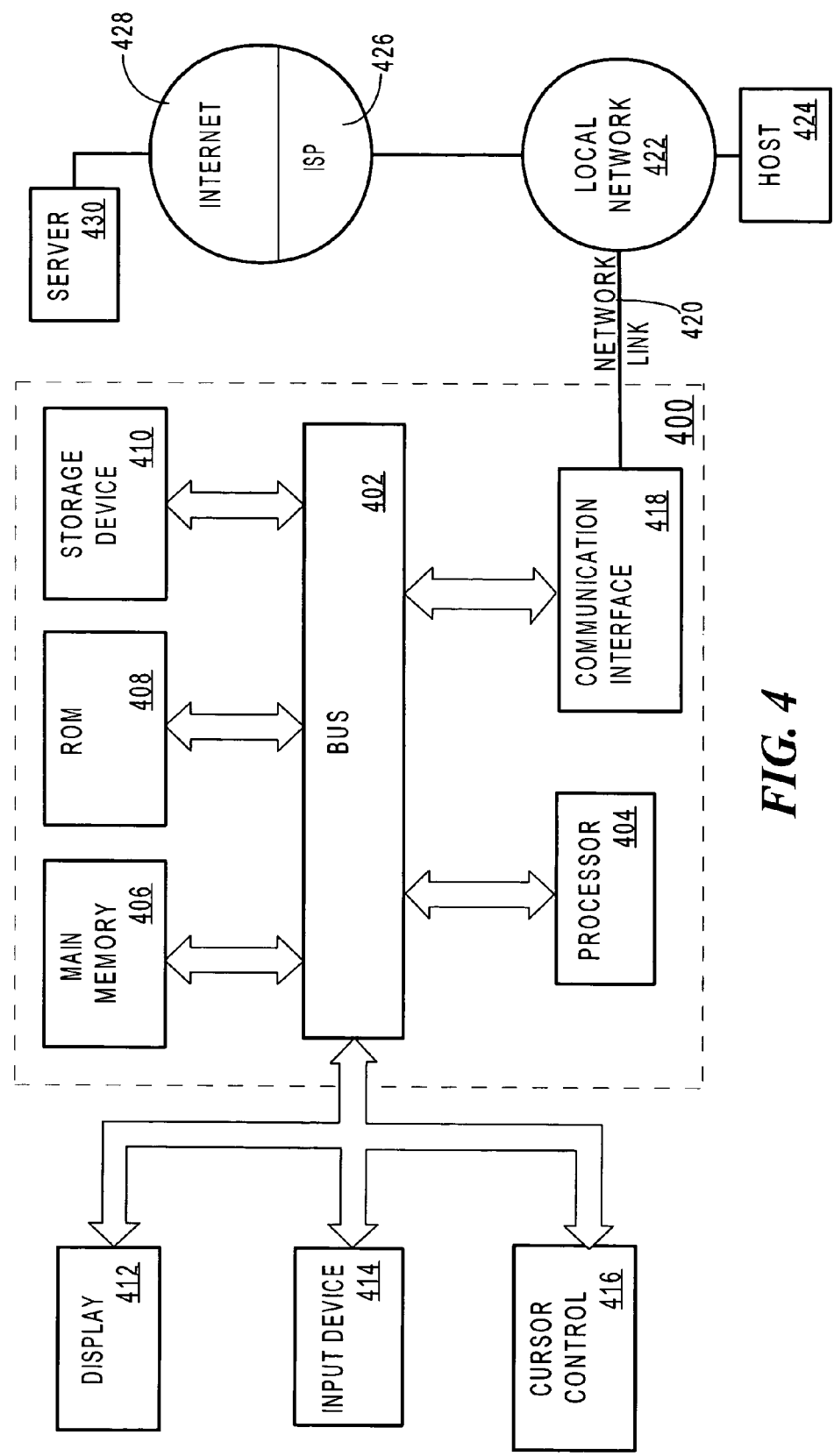
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with entry to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed:

1. A method comprising the steps of:
   identifying a set of events, one or more of which are captured in images from one or more cameras;
   generating a plurality of similarity scores, wherein generating the plurality of similarity scores comprises, for each event in the set of events, generating a set of one or more similarity scores;
   wherein each similarity score in the set of similarity scores that is associated with an event of the set of events (a) is relative to another event, and (b) reflects how similar the event is to the other event;
   identifying a feature set of a target event;
   determining probable matches to the target event by:
   determining similarity between the target event and only a particular subset of the set of events;
   wherein determining similarity between the target event and only the particular subset of the set of events is performed by comparing the feature set of the target event with only the feature sets of the events in the particular subset;

wherein the particular subset includes less than all of the events in the set of events;

from among the events in the particular subset, determining that events in a first subset of events of the particular subset are probable matches to the target event;

wherein the first subset of events includes less than all of the events in the particular subset;

wherein the first subset is determined based, at least in part, on a similarity between the feature set of the target event and feature sets of events in said particular subset; and after determining that the first subset of events are probable matches to the target event, determining which events in a second subset of events are probable matches to the target event;

wherein determining which events in the second subset of events are probable matches to the target event is performed based how similar the events in the second subset are to events in the first subset, as indicated by a subset of the plurality of similarity scores;

wherein determining which events in the second subset of events are probable matches to the target event includes determining that a subset of the second subset are probable matches to the target event;

wherein the step of determining that a subset of the second subset of events are probable matches to the target event includes determining that a particular event is a probable match to the target event without comparing the feature set of the target event to any feature set of the particular event;

wherein the method is performed by one or more computing devices.

2. The method of claim 1, further comprising:
storing features sets for only a subset of the events; and
when the second subset is determined, at least one of the events in the second subset does not have a stored feature set.

3. One or more non-transitory machine-readable media storing instructions which, when executed by one or more processors, cause performance of the method recited in claim 2.

4. The method of claim 1, further comprising, for each event in the set of events:
determining whether said each event is associated with a feature set; and
if said each event is not associated with a feature set, then generating a new feature set for said each event and associating the new feature set with said each event.

5. One or more non-transitory machine-readable media storing instructions which, when executed by one or more processors, cause performance of the method recited in claim 4.

6. The method of claim 1, further comprising:
associating a scored-event list with each event in the set of events; and
the scored-event list associated with each event indicates one or more other events and a similarity score between said each event and each event in said one or more other events.

7. The method of claim 6, wherein associating a scored-event list with each event in the set of events is performed by associating no more than a specified maximum number of events with each event.

8. One or more non-transitory machine-readable media storing instructions which, when executed by one or more processors, cause performance of the method recited in claim 7.

9. The method of claim 6, wherein associating a scored-event list with each event in the set of events comprises including, in the scored-event list for a particular event, only other events that have similarity scores above a particular threshold relative to said particular event.

10. One or more non-transitory machine-readable media storing instructions which, when executed by one or more processors, cause performance of the method recited in claim 9.

11. One or more non-transitory machine-readable media storing instructions which, when executed by one or more processors, cause performance of the method recited in claim 6.

12. The method of claim 6, further comprising, for each event in the set of events:
determining whether a preceding event in the set of events that precedes said each event is indicated by the scored-event list of said each event; and
if the preceding event is not indicated by the scored-event list of said each event, then:
generating a similarity score between the preceding event and said each event; and
updating the scored-event list of said each event to include an entry to the preceding event.

13. One or more non-transitory machine-readable media storing instructions which, when executed by one or more processors, cause performance of the method recited in claim 12.

14. The method of claim 1, wherein each event in the set of events is associated with at least one of the following criteria: the date and time of the event, information that indicates one or more cameras that captured the event or physical location of the one or more cameras.

15. The method of claim 14, wherein each similarity score in the set of similarity scores is weighted based on the criteria.

16. One or more non-transitory machine-readable media storing instructions which, when executed by one or more processors, cause performance of the method recited in claim 15.

17. One or more non-transitory machine-readable media storing instructions which, when executed by one or more processors, cause performance of the method recited in claim 14.

18. The method of claim 1, wherein the step of determining that a first subset of events are probable matches to the target event includes:
inspecting a scored-event list associated with the target event to identify any matching events that were created before the target event; and
inspecting scored-event lists associated with events created after the target event to identify any matching events that were created after the target event.

19. One or more non-transitory machine-readable media storing instructions which, when executed by one or more processors, cause performance of the method recited in claim 18.

20. One or more non-transitory machine-readable media storing instructions which, when executed by one or more processors, cause performance of the method recited in claim 1.

21. A method comprising the steps of:
identifying a set of events captured in images from one or more cameras;

for each event in the set of events, generating a set of one or more similarity scores;

wherein each similarity score in the set of similarity scores that is associated with an event (a) is relative to another event, and (b) reflects how similar the event is to the other event;

determining probable matches to a target event by:
  determining that a first subset of events are probable matches to the target event based, at least in part, on a similarity between a feature set of the target event and feature sets of events in said first subset; and
  determining that a second subset of events are probable matches to the target event based on similarity scores between events in the first subset and events in the second subset;

wherein the step of determining that a second subset of events are probable matches to the target event includes determining that a particular event is a probable match to the target event without comparing the feature set of the target event to any feature set of the particular event;

wherein the similarity score between each event in the first subset and the target event is above a first threshold and each similarity score between an event in the second subset and an event in the first subset is above a second threshold that is different from the first threshold;

wherein the method is performed by one or more computing devices.

22. One or more non-transitory machine-readable media storing instructions which, when executed by one or more processors, cause performance of the method recited in claim 21.

23. A method comprising the steps of:
  identifying a set of events captured in images from one or more cameras;
  for each event in the set of events, generating a set of one or more similarity scores;
  wherein each similarity score in the set of similarity scores that is associated with an event (a) is relative to another event, and (b) reflects how similar the event is to the other event;
  determining probable matches to a target event by:
    determining that a first subset of events are probable matches to the target event based, at least in part, on a similarity between a feature set of the target event and feature sets of events in said first subset; and
    determining that a second subset of events are probable matches to the target event based on similarity scores between events in the first subset and events in the second subset;
  wherein the step of determining that a second subset of events are probable matches to the target event includes determining that a particular event is a probable match to the target event without comparing the feature set of the target event to any feature set of the particular event;
  wherein a first threshold represents a first maximum number of events in the first subset of events that best match the target event according to similarity score; and
  wherein a second threshold represents a second maximum number of events in the second subset of events that best match an event in the first subset of events according to similarity score;
  wherein the method is performed by one or more computing devices.

24. One or more non-transitory machine-readable media storing instructions which, when executed by one or more processors, cause performance of the method recited in claim 23.

* * * * *